(12) United States Patent
Kaji et al.

(10) Patent No.: US 11,312,090 B2
(45) Date of Patent: Apr. 26, 2022

(54) FIBER-REINFORCED RESIN MOLDED ARTICLE AND METHOD FOR MANUFACTURING FIBER-REINFORCED RESIN MOLDED ARTICLE

(71) Applicant: Mitsubishi Chemical Corporation, Chiyoda-ku (JP)

(72) Inventors: Satoshi Kaji, Tokyo (JP); Tsuneo Takano, Tokyo (JP); Kazuhisa Ikeda, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 301 days.

(21) Appl. No.: 16/379,829

(22) Filed: Apr. 10, 2019

(65) Prior Publication Data

US 2019/0232577 A1 Aug. 1, 2019

Related U.S. Application Data

(63) Continuation of application No. PCT/JP2017/042572, filed on Nov. 28, 2017.

(30) Foreign Application Priority Data

Nov. 29, 2016 (JP) .............................. JP2016-230990

(51) Int. Cl.
*B29C 70/46* (2006.01)
*B29C 70/18* (2006.01)
(Continued)

(52) U.S. Cl.
CPC ............ *B29C 70/465* (2013.01); *B29C 43/20* (2013.01); *B29C 43/34* (2013.01); *B29C 70/18* (2013.01);
(Continued)

(58) Field of Classification Search
CPC ......... B29C 43/20; B29C 43/18; B29C 70/18; B29C 70/345; B29C 70/465; *B32B 5/022* (2013.01); *B32B 5/12* (2013.01); *B32B 5/28* (2013.01); *B32B 27/12* (2013.01); *B32B 2260/023* (2013.01); *B32B 2260/046* (2013.01); *B32B 2262/106* (2013.01)

(56) References Cited

U.S. PATENT DOCUMENTS

| 5,190,802 A | * | 3/1993 | Pilato ........................ B32B 5/26 428/111 |
| 5,283,103 A | | 2/1994 | Nakai et al. |
| 2017/0239895 A1 | | 8/2017 | Takehara et al. |

FOREIGN PATENT DOCUMENTS

| EP | 3 321 055 A1 | 5/2018 |
| JP | 56-095633 | 8/1981 |

(Continued)

OTHER PUBLICATIONS

Extended European Search Report dated Nov. 19, 2019, in Patent Application No. 17876810.7, 7 pages.
(Continued)

*Primary Examiner* — Camie S Thompson
(74) *Attorney, Agent, or Firm* — Oblon, McClelland, Maier & Neustadt, L.L.P.

(57) ABSTRACT

This fiber-reinforced resin molded article has: a sheet molding compound layer; a continuous fiber reinforcing material layer; and a barrier layer, wherein the barrier layer is interposed between the sheet molding compound layer and the continuous fiber reinforcing material layer.

20 Claims, 3 Drawing Sheets

(51) Int. Cl.
*B32B 5/02* (2006.01)
*B32B 5/12* (2006.01)
*B29C 43/34* (2006.01)
*B32B 27/12* (2006.01)
*B29C 43/20* (2006.01)
*B32B 5/28* (2006.01)

(58) Field of Classification Search
CPC ........ B29K 2105/0872; B32B 2250/03; B32B 2260/021; B32B 2260/023; B32B 2260/046; B32B 2262/0253; B32B 2262/0261; B32B 2262/0269; B32B 2262/10; B32B 2262/101; B32B 2262/103; B32B 2262/105; B32B 2605/08; B32B 2605/18; B32B 5/022; B32B 5/12; B32B 5/28; C08J 5/24; B29L 9/00
USPC ......... 428/298.1, 293.7, 297.1, 299.4, 299.7, 428/299.1, 295.1, 300.7; 442/281; 264/113, 258
See application file for complete search history.

(56) References Cited

FOREIGN PATENT DOCUMENTS

| JP | 56-115248 | 9/1981 |
|---|---|---|
| JP | 63-004915 | 1/1988 |
| JP | 3-051108 | 3/1991 |
| JP | 5-85179 | 4/1993 |
| JP | 2003-311736 | 11/2003 |
| JP | 2004-291265 A | 10/2004 |
| JP | 2008-246981 | 10/2008 |
| JP | 2010-264746 | 11/2010 |
| JP | 2011-56764 A | 3/2011 |
| JP | 2012-240276 | 12/2012 |
| WO | WO 2016/060062 A1 | 4/2016 |

OTHER PUBLICATIONS

Office Action dated Sep. 8, 2020 in corresponding Japanese Patent Application No. 2020-005497 (with English Translation), 4 pages.
Combined Chinese Office Action and Search Report dated Oct. 14, 2020 in Patent Application No. 201780073283.4 (with English language translation), 16 pages.
Chinese Office Action dated Apr. 19, 2021 in Chinese Patent Application No. 201780073283.4 (with unedited computer generated English translation), 14 pages.
International Search report dated Jan. 9, 2018 in PCT/JP2017/042572, filed on Nov. 28, 2017 (with English Translation).
Japanese Office Action dated Mar. 5, 2019 in Japanese Application 2017-567268 (With English Translation).
European Office Action dated Sep. 16, 2020 in Patent Application No. 17 876 810.7, 5 pages.

* cited by examiner

FIBER-REINFORCED RESIN MOLDED ARTICLE AND METHOD FOR MANUFACTURING FIBER-REINFORCED RESIN MOLDED ARTICLE

The present application is a continuation application of International Application No. PCT/JP2017/042572, filed on Nov. 28, 2017, which claims the benefit of priority of the prior Japanese Patent Application No. JP 2016-230990 filed in Japan on Nov. 29, 2016, and the contents of which are hereby incorporated by reference.

TECHNICAL FIELD

The present invention relates to a fiber-reinforced resin molded article and a method for manufacturing a fiber-reinforced resin molded article.

BACKGROUND ART

A fiber-reinforced resin molded article is used in a broad range of fields related to sports and leisure applications and also industrial applications such as automobiles, aircrafts, or the like as it has high strength and high rigidity.

For example, in the field of automotive industry, to reduce the weight of a vehicle while ensuring the strength, the fiber-reinforced resin molded article is used not only for a structural member of a vehicle skeleton like filler but also for a non-structural member like door out panel for which aesthetic property is required.

When the fiber-reinforced resin molded article is used for a part or a member that is required to have strength, in particular, a continuous fiber-reinforcing material is arranged and disposed on a surface of the fiber-reinforced resin molded article. As for this continuous fiber-reinforcing material, a prepreg obtained by impregnating a thermosetting resin composition in continuous fibers is generally used.

The prepreg is produced by a wet method in which a resin composition is dissolved in a solvent to have low viscosity and impregnated in reinforcement fibers, or a hot melt method (dry method) in which a resin composition is heated to have low viscosity and impregnated in reinforcement fibers, or the like.

As for the prepreg used for above use, there is a prepreg in which a thermosetting resin composition is impregnated in continuous fibers that are aligned in one direction and a prepreg in which a thermosetting resin composition is impregnated in a textile formed of reinforcement fibers.

A fiber-reinforced resin molded article having continuous fiber-reinforcing material arranged and disposed on a surface thereof can be produced by applying a continuous fiber-reinforcing material to the inside of a cavity that is formed by combining top and bottom frames, for example, by extruding a molten resin to the inside of a cavity.

Other than that, as a method of producing a fiber-reinforced resin molded article having a continuous fiber-reinforcing material 13 arranged and disposed on a surface thereof as shown in FIG. 3, there is a method of using a sheet molding compound 11 (hereinbelow, it is also described as "SMC 11"). To the inside of a cavity that is formed by combining a top mold 21 and a bottom mold 22, the continuous fiber-reinforcing material 13 and the SMC 11 are disposed, and by applying pressure to heated top and bottom molds 21, 22, the resin contained in the SMC 11 melts and the continuous fiber-reinforcing material 13 is melt-adhered so that a desired fiber-reinforced resin molded article is prepared.

Furthermore, the SMC 11 is a product of impregnation of a composition containing thermosetting resin in non-continuous reinforcement fibers (staple fibers)

However, as the sheet molding compound contains a non-continuous reinforcement fiber, when the sheet molding compound is melt and applied with pressure, the mixture of non-continuous reinforcement fiber and melt resin shows a fluid movement on a surface of a continuous fiber-reinforcing material. Due to this fluid movement, there is a problem that the orientation of continuous fiber in the continuous fiber-reinforcing material is disrupted and displacement of the continuous fiber-reinforcing material is yielded after molding, and thus the continuous fiber-reinforcing material is not accurately arranged and disposed on a site that is originally aimed to be reinforced.

Furthermore, according to a certain finding, it is known that, when the orientation of continuous fiber is off by 3 degrees in terms of the angle from the original direction, the tensile strength is decreased by 10% or so, and it is decreased by 50% or so when the orientation is off by 12 degrees. Thus, there is also a problem that the strength of a fiber-reinforced resin molded article is not sufficiently exhibited as caused by disorderly orientation of continuous fiber.

There is also a problem that, as the continuous fiber-reinforcing material having continuous fibers with disorderly orientation is arranged and disposed on a surface layer, the aesthetic property of an outer appearance of a member is deteriorated.

Accordingly, in Patent Document 1, a method of suppressing disorderly orientation or displacement of continuous fibers in a continuous fiber-reinforcing material disposed on a surface of a molded article by adding a continuous fiber-reinforcing material to the inside of a cavity formed by mold closing and adding a melt resin to inside of the cavity to produce an intermediate molded article, and adding a next melt resin to top part of the intermediate molded article followed by curing is disclosed.

Furthermore, Patent Document 2 discloses a method of suppressing disorderly orientation of continuous fiber by forming a recessed part on a boundary between a site at which a continuous fiber-reinforcing material is disposed on a surface and a site other than that.

CITATION LIST

Patent Document

Patent Document 1: JP 2012-240276 A
Patent Document 2: JP 5-85179 A

SUMMARY OF THE INVENTION

Problem to be Solved by the Invention

However, because the method described in Patent Document 1 requires production of an intermediate molded article during the production process, it has a problem in terms of the productivity. For example, when a molded article is produced by using one kind of a molding frame, for obtaining a final molded article, a possible occurrence of a need for changing molding conditions like cavity temperature after producing an intermediate molded article has to be also considered, and thus a limitation like having production cycle extended in long period occurs.

Furthermore, according to the method described in Patent Document 2, the boundary between a site at which a continuous fiber-reinforcing material is disposed and a site other than that has thin thickness by the recessed part of cavity. There is a problem that, because this boundary becomes a site to which stress is concentrated when external force is applied, it may easily become a starting point of breakage.

The present invention provides a fiber-reinforced resin molded article having excellent strength and suppressed decrease in aesthetic property compared to a fiber-reinforced resin molded article of a related art, and also a method for producing the fiber-reinforced resin molded article in which the method has more excellent productivity compared to a method of a related art.

Means for Solving Problem

Under the circumstances described above, the inventors of the present invention conducted intensive studies. As a result, it was found that, when a barrier layer is disposed between a sheet molding compound and a continuous fiber-reinforcing material, the fluid movement caused by melting of a thermosetting resin in a sheet molding compound during molding can be blocked. Namely, it was found that, by disposing a barrier layer, the problem of disorderly orientation of a continuous fiber-reinforcing material can be resolved and the effect of enhancing the strength by a continuous fiber-reinforcing material can be sufficiently exhibited, and thus the present invention is completed accordingly.

Namely, the present invention has the following aspects.

[1] A fiber-reinforced resin molded article having a layer of a sheet molding compound, a layer of a continuous fiber-reinforcing material, and a barrier layer, in which the barrier layer is interposed between the layer of the sheet molding compound and the layer of the continuous fiber-reinforcing material.

[2] The fiber-reinforced resin molded article described in [1], in which the continuous fiber-reinforcing material contains a continuous reinforcement fiber and meandering (snake-shaped) angle θ of the continuous reinforcement fiber on a surface of the layer of the continuous fiber-reinforcing material is 15 degrees of less.

[3] The fiber-reinforced resin molded article described in [1] or [2], in which a resin derived from the sheet molding compound is not present on a surface at which the barrier layer and the layer of the continuous fiber-reinforcing material are in contact with each other.

[4] The fiber-reinforced resin molded article described in any one of [1] to [3], in which a resin derived from the continuous fiber-reinforcing material is present on a surface layer part of the barrier layer being in contact with the layer of the continuous fiber-reinforcing material, and also near the surface layer part in thickness direction.

[5] The fiber-reinforced resin molded article described in any one of [1] to [4], in which porosity of the barrier layer is 30% or less.

[6] The fiber-reinforced resin molded article described in any one of [1] to [5], in which the barrier layer has a structure with a plurality of fibers crossing one another.

[7] The fiber-reinforced resin molded article described in [6], in which inter-fiber crossing number of the fiber used for the barrier layer is 5 crossings/cm$^2$ or more.

[8] The fiber-reinforced resin molded article described in any one of [1] to [7], in which the barrier layer includes at least one selected from a cloth prepreg, a non-crimp fabric, a cord fabric, and a non-woven fabric.

[9] The fiber-reinforced resin molded article described in [8], in which the barrier layer includes the non-woven fabric.

[10] The fiber-reinforced resin molded article described in any one of [1] to [9], in which the layer of the continuous fiber-reinforcing material includes a reinforcement fiber and the reinforcement fiber is aligned in one direction.

[11] The fiber-reinforced resin molded article described in any one of [1] to [10], in which the layer of the sheet molding compound includes a thermoplastic resin.

[12] The fiber-reinforced resin molded article described in any one of [1] to [11] being an integration molded article of a laminate having the sheet molding compound, an article constituting the barrier layer, and the continuous fiber-reinforcing material laminated in this order.

[13] A method for manufacturing a fiber-reinforced resin molded article having a layer of a sheet molding compound, a barrier layer, and a layer of a continuous fiber-reinforcing material, including: a step of overlaying a sheet molding compound, an article constituting the barrier layer, and a continuous fiber-reinforcing material to be laminated in this order; and a step of carrying out molding by melting a resin of the sheet molding compound.

[14] The method for manufacturing a fiber-reinforced resin molded article described in [13], in which the barrier layer has a structure with a plurality of fibers crossing one another.

[15] The method for manufacturing a fiber-reinforced resin molded article described in [13], in which the barrier layer is formed of at least one selected from a cloth prepreg, a non-crimp fabric, a cord fabric, and a non-woven fabric.

[16] The method for manufacturing a fiber-reinforced resin molded article described in [15], in which the barrier layer is a non-woven fabric.

[17] The method for manufacturing a fiber-reinforced resin molded article described in any one of [13] to [16], in which the layer of the continuous fiber-reinforcing material includes a reinforcement fiber and the reinforcement fiber is aligned in one direction.

[18] The method for manufacturing a fiber-reinforced resin molded article described in any one of [13] to [17], in which the layer of the sheet molding compound includes a thermoplastic resin.

[19] The method for manufacturing a fiber-reinforced resin molded article described in any one of [13] to [18], in which the step of carrying out molding by melting a resin is performed by thermal compression molding using a mold.

Effect of the Invention

The fiber-reinforced resin molded article of the present invention has suppressed disorderly orientation of continuous fiber of a continuous fiber-reinforcing material that is arranged and disposed on a surface, and has excellent strength and aesthetic property. Furthermore, according to the method for manufacturing a fiber-reinforced resin molded of the present invention, a fiber-reinforced resin molded article having excellent strength and aesthetic property can be efficiently produced.

MODE(S) FOR CARRYING OUT THE INVENTION

[Fiber-Reinforced Resin Molded Article]

Figure 1:
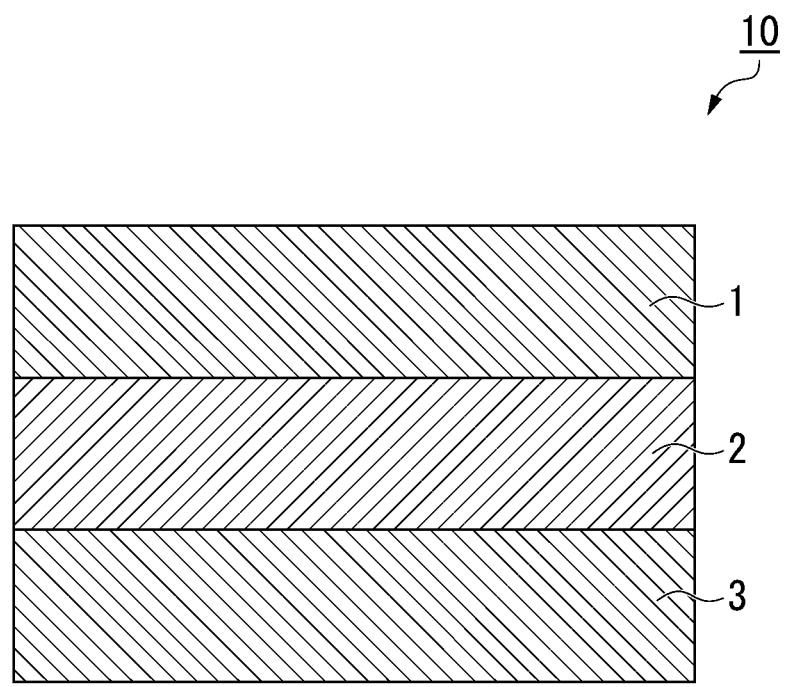
FIG. 1 is a cross-section side view illustrating one example of the fiber-reinforced resin molded article of the present invention.

As shown in FIG. 1, a fiber-reinforced resin molded article 10 of the present invention (hereinbelow, it is also described as a "present molded article") is a laminate of a layer of a sheet molding compound 1, a layer of a continuous fiber-reinforcing material 3, and a barrier layer 2.

The present molded article is a molded article in which a layer of a continuous fiber-reinforcing material is laminated on at least one surface of the layer of the sheet molding compound. With regard to the embodiments of the lamination of those two types, it is possible that the layer of the continuous fiber-reinforcing material is laminated only on a single surface of the layer of the sheet molding compound or the layer of the continuous fiber-reinforcing material is laminated on both surfaces of the layer of the sheet molding compound.

However, in any case that the layer of the continuous fiber-reinforcing material is laminated only on a single surface of the layer of the sheet molding compound or it is laminated on both surfaces of the layer of the sheet molding compound, the lamination is achieved by having the barrier layer interposed between the layer of the sheet molding compound and the layer of the continuous fiber-reinforcing material.

The barrier layer is interposed between the layer of the sheet molding compound and the layer of the continuous fiber-reinforcing material of the present molded article. From the viewpoint of achieving the maximum strength that can be exhibited by the present molded article, it is preferable for the present molded article that the layer of the sheet molding compound and the layer of the continuous fiber-reinforcing material have no part in which they are in contact with each other without being interposed by the barrier layer.

However, the present invention is not necessarily limited to the above, and, as long as it is within a range in which the effect of the present invention is not impaired, there may be a part in which the layer of the sheet molding compound and the layer of the continuous fiber-reinforcing material are in contact with each other without being interposed by the barrier layer, and, as an acceptable embodiment of the lamination, it is also encompassed by the present invention.

(Layer of Sheet Molding Compound)

The layer of the sheet molding compound is a sheet-like substrate composed of a cured product of a sheet molding compound having a composition containing thermosetting resin (hereinbelow, it is also described as a "resin composition (A)") impregnated in non-continuous reinforcement fibers. Herein, the "non-continuous reinforcement fiber" means a reinforcement fiber of which fiber length is less than 100 mm per fiber.

The resin composition (A) may also contain, as other constitutional component of the thermosetting resin, a low shrinkage agent like thermoplastic resin, or additives like filler and flame retardant. Content of the additives is preferably 1 to 50% by mass or so when the total mass of the resin composition (A) is 100% by mass.

When the present molded article is used for a member for which the flame retardancy is required, it is preferable that the resin composition (A) contains a flame retardant. As for the flame retardant, those well known in the field can be used, and also a compound containing phosphorus and nitrogen, a bromine compound, a phosphorus compound, metal hydroxide, a silicon compound, a hindered amine compound, or the like can be exemplified, for example.

Examples of the thermosetting resin to be contained in the resin composition (A) include an epoxy resin, a vinyl ester resin, an unsaturated polyester resin, a polyimide resin, a maleimide resin, and a phenolic resin, but it is not limited thereto. When carbon fiber is used as the reinforcement fiber, an epoxy resin and a vinyl ester resin are preferably used in consideration of adhesion property to carbon fibers.

From the viewpoint of providing physical properties like excellent strength by the present molded article, the layer of the sheet molding compound may contain a thermoplastic resin.

The thermoplastic resin is preferably used as a constitutional component of the resin composition (A), and it is preferably 1 to 30% by mass or so, and more preferably 1 to 15% by mass or so when the total mass of the resin composition (A) is 100% by mass.

Examples of the thermoplastic resin which can be preferably used herein include a polyolefin resin such as polyethylene and polypropylene, a polyamide resin such as nylon 6 or nylon 66, a polyester resin such as polyethylene terephthalate or polybutylene terephthalate, polyether ketone, polyether sulfone, and an aromatic polyamide resin, but it is not limited thereto.

As for the type of the reinforcement fiber that can be used as a non-continuous reinforcement fiber of the layer of the sheet molding compound, carbon fiber, glass fiber, aramid fiber, boron fiber, silicon carbide fiber, high strength polyethylene, polyparaphenylene benzobisoxazole (PBO) fiber, nylon fiber, and stainless fiber can be exemplified, but it is not limited thereto. Among them, from the viewpoint of having light weight and high rigidity, it is preferable to use carbon fiber.

The layer of the sheet molding compound may have a monolayer structure composed of one layer or a multilayer structure composed of plural layers, as long as it is laminated with the layer of the continuous fiber-reinforcing material while being interposed by the barrier layer. In case of a multilayer structure, it is preferably composed of plural layers of the sheet molding compound and does not contain any layer of the continuous fiber-reinforcing material or barrier layer, but it is not limited thereto.

(Layer of the Continuous Fiber-Reinforcing Material)

The layer of the continuous fiber-reinforcing material may be a sheet-like substrate composed of continuous reinforcement fiber or it may be composed of a cured product of a prepreg having a composition containing thermosetting resin (hereinbelow, also referred to as a "resin component (B)") impregnated in continuous reinforcement fibers. Herein, the "continuous reinforcement fiber" means a reinforcement fiber of which fiber length is 100 mm or more per fiber.

The resin composition (B) may also contain, as other constitutional component, a low shrinkage agent like thermoplastic resin, or additives like filler and flame retardant. Content of the additives is preferably 1 to 50% by mass or so when the total mass of the resin composition (B) is 100% by mass.

When the present molded article is used for a member for which the flame retardancy is required, it is preferable that the resin composition (B) contains a flame retardant. As for the flame retardant, those well known in the field can be used, and also a compound containing phosphorus and nitrogen, a bromine compound, a phosphorus compound, metal hydroxide, a silicon compound, a hindered amine compound, or the like can be exemplified, for example.

Examples of the thermosetting resin to be contained in the resin composition (B) are the same as the aforementioned thermosetting resin to be contained in the resin composition (A), but it is not limited thereto. When carbon fiber is used as the reinforcement fiber, an epoxy resin and a vinyl ester resin are preferably used, which is the same as the resin composition (A).

Examples of the thermoplastic resin which may be contained as a constitutional component of the resin composition (B) are the same as the aforementioned thermoplastic resin which may be contained as a constitutional component of the resin composition (A), but it is not limited thereto.

In a case in which the present molded article is used for a member that is particularly required to have strength, it is preferable that, from the viewpoint of obtaining desired strength of the present molded article, the layer of the continuous fiber-reinforcing material contains reinforcement fibers facing in one direction.

As a specific example of the reinforcement fibers facing in one direction, a sheet-like substrate in which continuous reinforcement fibers are aligned neatly in one direction (UD sheet) or a substrate like UD prepreg having the resin composition (B) impregnated in a UD sheet, or the like are preferable.

The layer of the continuous fiber-reinforcing material may be a fabric composed of continuous reinforcement fibers or a cloth prepreg having the resin composition (B) impregnated in a fabric of reinforcement fibers.

Type of the reinforcement fiber which can be used as a continuous reinforcement fiber of the layer of the continuous fiber-reinforcing material is the same as the type of the reinforcement fiber which can be used as a non-continuous reinforcement fiber of the layer of the sheet molding compound. It is also the same in that use of a carbon fiber is preferable from the viewpoint of having light weight and high rigidity.

The layer of the continuous fiber-reinforcing material may have a monolayer structure composed of one layer or a multilayer structure composed of plural layers, as long as it is laminated with the layer of the sheet molding compound while being interposed by the barrier layer. In case of a multilayer structure, it is preferably composed of plural layers of the continuous fiber-reinforcing material and does not contain any layer of the sheet molding compound or barrier layer, but it is not necessarily limited thereto. Furthermore, in accordance with the use or desired performance of a molded article, number of the layer of the continuous fiber-reinforcing material may be adjusted.

(Barrier Layer)

By having the barrier layer, the fiber-reinforced resin molded article of the present invention has suppressed disorderly orientation of continuous fiber on a surface of the layer of the continuous fiber-reinforcing material and the meandering angle θ of continuous fiber on the surface can be kept at 15 degrees or less.

The meandering angle θ indicates the maximum value of a meandering angle of continuous fiber, which is obtained by observing a surface of the layer of the continuous fiber-reinforcing material of the fiber-reinforced resin molded article and carrying out calculation based on the following method.

(Method for Calculating Meandering Angle)

Figure 4:
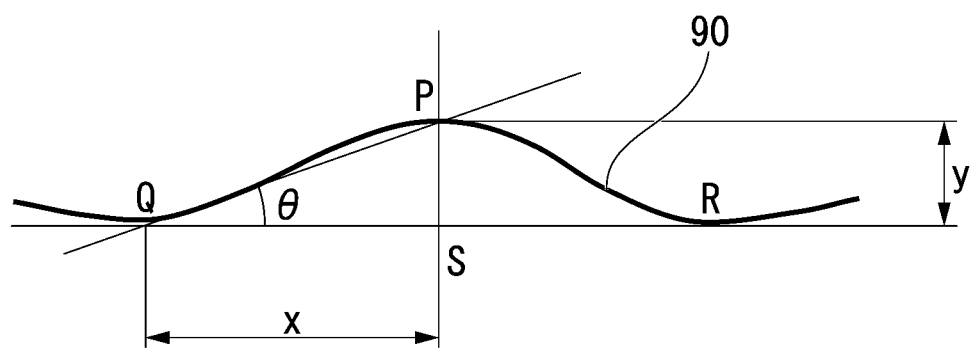
FIG. 4 is an outline drawing explaining the method for measuring meandering angle of a reinforcement fiber.

The highest point of the mountain part of a continuous fiber 90, which is meandering as shown in FIG. 4, is designated P, valleys at each side of the highest point are designated as Q and R, respectively, cross point between straight line QR and the vertical line from the highest point P to the straight line QR is designated S, and angle formed between straight line PQ and the straight line QR is designated as θ. Length x of the straight line QS and length y of the straight line PS are measured by using a scale or a ruler, and θ value is calculated from $\tan \theta = y/x$ and used as meandering angle.

As the meandering angle θ is 15 degrees or less, there is a tendency that the strength expression rate of the fiber-reinforced resin molded article of the present invention has a sufficiently high value relative to a designed value and a favorable aesthetic property of outer appearance is obtained. The meandering angle θ is more preferably 10 degrees or less, even more preferably 8 degrees or less, and particularly more preferably 5 degrees or less. More specifically, the meandering angle is preferably more than 0 but 15 degrees or less, more preferably more than 0 but 10 degrees or less, even more preferably more than 0 but 8 degrees or less, and particularly preferably more than 0 but 5 degrees or less.

Furthermore, with regard to the fiber-reinforced resin molded article of the present invention, it is preferable to have substantially no presence of a resin derived from the sheet molding compound on a surface at which the barrier layer and the layer of the continuous fiber-reinforcing material are in contact with each other, because, in that way, the disorderly orientation of continuous fiber on a surface of the layer of the continuous fiber-reinforcing material tends to be suppressed.

Namely, the barrier layer preferably has a function of preventing a contact between the resin derived from the sheet molding compound and the layer of the continuous fiber-reinforcing material.

Meanwhile, in the fiber-reinforced resin molded article of the present invention, it is preferable that the permeated resin derived from the continuous fiber-reinforcing material is present on a surface layer part of the barrier layer being in contact with the layer of the continuous fiber-reinforcing material, and also near the surface layer part in thickness direction due to the tendency that, by having higher adhesion property between the layer of the continuous fiber-reinforcing material and barrier layer, not only the mechanical physical property of the molded article is enhanced but also a deviation in the physical property decreases.

Herein, the expression "near (the surface layer part) in thickness direction" means a range from the surface layer part to almost half of the thickness of the barrier layer.

The barrier layer in the fiber-reinforced resin molded article of the present invention can be formed by laminating the aforementioned sheet molding compound, an article constituting the barrier layer, and the aforementioned continuous fiber-reinforcing material in this order followed by integral molding.

As the weight of an article constituting the barrier layer per unit area thereof is set in a range of 10 to 400 $g/m^2$, suppression of the disorderly orientation of continuous fiber and enhancement of the adhesion property between the layer of the continuous fiber-reinforcing material and barrier layer can be obtained simultaneously, and also voids inside the molded article are reduced and excellent mechanical physical property is obtained, and thus preferable. The weight per unit area is preferably in a range of 15 to 350 $g/m^2$, more preferably in a range of 25 to 300 $g/m^2$, and particularly preferably in a range of 50 to 250 $g/m^2$.

As the weight of an article constituting the barrier layer per unit area thereof is preferably set at 10 g/m² or more, more preferably at 15 g/m² or more, even more preferably at 25 g/m² or more, and particularly preferably at 50 g/m² or more, there is a tendency that the aforementioned disorderly orientation of continuous fiber can be suppressed. Furthermore, as the weight of an article constituting the barrier layer per unit area thereof is set at 400 g/m² or less, more preferably at 350 g/m² or less, even more preferably at 300 g/m² or less, and particularly preferably at 250 g/m² or less, there is a tendency that the adhesion property between the layer of the continuous fiber-reinforcing material and barrier layer is enhanced, and, simultaneously, voids inside the molded article are reduced and excellent mechanical physical property of a molded article is obtained. The weight per unit area can be measured by cutting a sample of 1 m² and measuring the weight of the sample.

Furthermore, as porosity of an article constituting the barrier is set at 30% or less, there is a tendency that suppression of the disorderly orientation of continuous fiber and enhancement of the adhesion property between the layer of the continuous fiber-reinforcing material and barrier layer can be obtained simultaneously, and thus preferable.

More preferably, the porosity is in a range of 3 to 25%, and more preferably in a range of 5 to 20%.

As the porosity is set at 30% or less, more preferably at 25% or less, and even more preferably at 20% or less, there is a tendency that permeation of a resin derived from the sheet molding compound to cause a contact with the layer of the continuous fiber-reinforcing material can be prevented.

Furthermore, as the porosity is preferably set at 3% or more, and more preferably at 5% or more, there is a tendency that the adhesion property between the layer of the continuous fiber-reinforcing material and barrier layer can be enhanced and, similarly, the adhesion property between the layer of the continuous fiber-reinforcing material and barrier layer can be enhanced.

Furthermore, the porosity means a ratio of space volume in total volume of an article constituting the barrier layer. The porosity can be calculated based on the following formula (1).

$$\varepsilon = (1 - G/\rho/V) \times 100 \quad (1)$$

In the formula, $\varepsilon$ indicates porosity (%), G indicates mass of a sample (g), $\rho$ indicates density of a sample (g/cm³), and V indicates volume of a sample (cm³).

The barrier layer is not particularly limited as long as it can suppress the disorderly orientation of continuous fiber on a surface of the layer of the continuous fiber-reinforcing material, and it can be suitably selected and used. However, a sheet-like substrate in which the plurality of fibers cross one another is preferable, since there is a tendency that the property of following a shape of the layer of the sheet molding compound and the layer of the continuous fiber-reinforcing material is excellent and excellent outer appearance and mechanical physical property of the fiber-reinforced resin molded article of the present invention are obtained.

The structure with the plurality of fibers crossing one another means a structure of an aggregate composed of the plurality of fibers in which contact points among fibers are present in large number due to crossing of the fibers in a direction other than the fiber length direction.

With regard to this structure with the plurality of fibers crossing one another, as the inter-fiber crossing number of a fiber is 5 crossings/cm² or more, there is a tendency that suppression of the disorderly orientation of continuous fiber and enhancement of the adhesion property between the layer of the continuous fiber-reinforcing material and barrier layer can be obtained simultaneously, and thus preferable.

The inter-fiber crossing number is more preferably is in a range of 10 to 500 crossings/cm², and more preferably in a range of 20 to 300 crossings/cm².

As the inter-fiber crossing number of a fiber is set at 5 crossings/cm² or more, more preferably at 10 crossings/cm² or more, and even more preferably 20 crossings/cm² or more, there is a tendency that permeation of a resin derived from the sheet molding compound to cause a contact with the layer of the continuous fiber-reinforcing material can be prevented.

Furthermore, as the inter-fiber crossing number of a fiber is set at 500 crossings/cm² or less, and more preferably at 300 crossings/cm² or less, there is a tendency that the property of following a shape of the layer of the sheet molding compound and the layer of the continuous fiber-reinforcing material by the barrier layer is excellent and also excellent outer appearance and mechanical physical property of the fiber-reinforced resin molded article of the present invention are obtained.

Furthermore, the inter-fiber crossing number can be measured by counting the crossing number using a microscope.

As a specific example of the sheet-like substrate having a structure with the plurality of fibers crossing one another that can be used as the barrier layer, a cloth prepreg, a non-crimp fabric, a woven fabric such as a cord fabric, and a non-woven fabric can be exemplified. The barrier layer is not necessarily limited to those shapes, hut a non-woven fabric is preferable in that it tends to have excellent adhesion property or the shape following property described above.

Furthermore, a random material sheet of non-continuous reinforcement fibers can be also suitably used as the barrier layer. In that case, the fiber length is preferably two times or more the fiber length of reinforcement fiber of the layer of the sheet molding compound.

In a case in which the barrier layer is a sheet-like substrate having the structure with the plurality of fibers crossing one another, it is preferable that an article constituting the barrier layer is impregnated with a composition containing a resin (hereinbelow, also referred to as a "resin component (C)"), because there is a tendency that the disorderly orientation of continuous fiber in the fiber-reinforced resin molded article of the present invention is suppressed more favorably and, simultaneously, more excellent mechanical physical property is obtained.

Content of the resin composition (C) in an article constituting the barrier layer is preferably in a range of 20 to 80% by weight relative to the total mass of an article constituting the barrier layer. As the content is within this range, suppression of the disorderly orientation of continuous fiber and enhancement of the adhesion property between the layer of the continuous fiber-reinforcing material and barrier layer can be obtained simultaneously, and also voids inside the molded article are reduced and an excellent mechanical physical property is obtained, and thus preferable. The content is more preferably in a range of 30 to 70% by weight, and more preferably in a range of 40 to 60% by weight.

As the content of the resin composition (C) in an article constituting the barrier is set at 20% by weight or more, more preferably at 30% by weight or more, and even more preferably at 40% by weight or more relative to the total mass of an article constituting the barrier layer, there is a tendency that suppression of the disorderly orientation of continuous fiber can be achieved, and, simultaneously, voids inside the molded article are reduced and an excellent mechanical physical property is obtained.

Furthermore, as the content of the resin composition (C) in an article constituting the barrier is set at 80% by weight or less, more preferably at 70% by weight or less, and even more preferably at 60% by weight or less relative to the total mass of an article constituting the barrier layer, there is a tendency that the adhesion property between the layer of the continuous fiber-reinforcing material and barrier layer is enhanced and the molded article has an excellent mechanical physical property.

The resin composition (C) may be a thermosetting resin composition, a thermoplastic resin composition, or a resin composition consisting of a mixture of them.

Examples of a thermosetting resin to be contained in the resin composition (C) are the same as the thermosetting resin to be contained in the resin composition (A) or the thermosetting resin to be contained in the resin composition (B), but it is not limited thereto. It is also the same in that, when carbon fiber is used as a reinforcement fiber, an epoxy resin and a vinyl ester are suitably used.

Examples of a thermoplastic resin to be contained in the resin composition (C) are the same as the thermoplastic resin which may be contained in the resin composition (A) or the thermoplastic resin which may be contained in the resin composition (B), but it is not limited thereto.

The resin composition (C) may also contain, as other constitutional component, additives like filler and flame retardant. When the total mass of the resin composition (C) is 100% by mass, it is preferable that content of those additives is 1 to 50% by mass or so. As for the flame retardant, those well known in the field can be used, and also a compound containing phosphorus and nitrogen, a bromine compound, a phosphorus compound, metal hydroxide, a silicon compound, a hindered amine compound, or the like can be exemplified, for example.

The fiber used for the barrier layer is preferably a reinforcement fiber. Type of the reinforcement fiber is not particularly limited, but carbon fiber, glass fiber, polyamide, or the like are preferable.

From a viewpoint of the cost for manufacturing the present molded article, it is preferable that only one layer of the barrier layer is present between the layer of the sheet molding compound and the layer of the continuous fiber-reinforcing material. However, it is not limited thereto, and a multilayer structure composed of plural layers is also possible. In case of a multilayer structure, it is preferably composed of plural layers without including the layer of the sheet molding compound or the layer of the continuous fiber-reinforcing material, but it is not necessarily limited thereto.

(Relationship Between Resin Composition (A), Resin Composition (B), and Resin Composition (C))

In the present molded article, the resins to be used for the resin composition (A), the resin composition (B), and the resin composition (C) can be the same resin, and it is also possible that only one of those resins is a different resin or all of those resins are different from one another.

Also for a case in which at least one of the layer of the sheet molding compound, the layer of the continuous fiber-reinforcing material, and barrier layer has a multilayer structure, the resin used for each single layer for constituting the multilayer structure can be the same resin, and it is also possible that only one of those resins is a different resin or all of those resins are different from one another.

(Use)

The fiber-reinforced resin molded article of the present invention can be used for sports goods like fishing pole, golf shaft, and bicycle frame, a frame or a body material of an automotive or an aircraft, or a member of a spaceship. In particular, since high-level toughness against rupture and mechanical strength are required in addition to lightweightness and flame retardancy for an automotive member, an aircraft member, or a spaceship member, the present molded article is suitably used therefor.

(Working Effect)

As explained in the above, in the present molded article, the barrier layer is laminated and interposed between the layer of the sheet molding compound and the layer of the continuous fiber-reinforcing material. Due to this reason, the disorderly orientation of continuous fiber in the layer of the continuous fiber-reinforcing material is removed. Accordingly, the present molded article sufficiently exhibits the effect of reinforcing the strength based on contribution by the layer of the continuous fiber-reinforcing material.

Furthermore, location displacement of a reinforcement material caused by the disorderly orientation of continuous fiber is also removed and a decrease in the aesthetic property is also removed.

[Method for Manufacturing Fiber-Reinforced Resin Molded Article]

The method for manufacturing a fiber-reinforced resin molded article of the present invention (hereinbelow, also described as a "present method") is a method for manufacturing a fiber-reinforced resin molded article having a layer of a sheet molding compound, a barrier layer, and a layer of a continuous fiber-reinforcing material.

The present method includes a step of overlaying a sheet molding compound, an article constituting the barrier layer, and a continuous fiber-reinforcing material such that they are laminated in this order (hereinbelow, also described as a "step (1)") and a step of carrying out molding by melting a resin of the sheet molding compound (hereinbelow, also described as a "step (2)").

The sheet molding compound of the present method is a substrate having the resin composition (A) impregnated in non-continuous reinforcement fibers, and the thermosetting resin impregnated in the sheet molding compound is preferably in a non-cured state or a semi-cured state. With regard to the resin composition (A) or non-continuous reinforcement fiber, the same context as described in the section of "layer of sheet molding compound" of "fiber-reinforced resin molded article" can be also employed.

From the viewpoint of obtaining desirable strength of a molded article that is manufactured by the present method, the sheet molding compound contains, as one of the components constituting the resin composition (A), a thermoplastic resin.

The sheet molding compound is not limited to a compound with layer shape, and it can be a compound with bulk shape as long as it has thickness that can be molded by a known molding method.

In accordance with a use or desired performance of a molded article to be produced by the present method, plural sheet molding compounds may be used in the step (1).

The continuous fiber-reinforcing material of the present method is a substrate composed of continuous reinforcement fibers. It may be also a prepreg having the resin composition (B) impregnated in continuous reinforcement fibers.

When the prepreg is used for a continuous fiber-reinforcing material, the thermosetting resin impregnated in the prepreg is preferably in a non-cured state or a semi-cured state.

If the prepreg in non-cured state is used for a continuous fiber-reinforcing material, the molding step is completed in one trial, and thus the molded article can have excellent adhesion strength or stability as well as enhanced productivity.

With regard to the resin composition (B) or continuous reinforcement fibers, the same context as described in the section of "layer of the continuous fiber-reinforcing material" of "fiber-reinforced resin molded article" can be also employed.

In a case in which a molded article manufactured by the present method is used for a member that is particularly required to have strength, it is preferable that, from the viewpoint of obtaining desired strength, the layer of the continuous fiber-reinforcing material contains reinforcement fibers facing in one direction.

As a specific example of the reinforcement fibers facing in one direction, a sheet-like substrate in which continuous reinforcement fibers are aligned neatly in one direction (UD sheet) or a substrate like UD prepreg having the resin composition (B) impregnated in a UD sheet, or the like are preferable.

The continuous fiber-reinforcing material may be a fabric composed of continuous reinforcement fibers or a cloth prepreg having the resin composition (B) impregnated in a fabric of reinforcement fibers.

With regard to the continuous fiber-reinforcing material, in accordance with the use or desired performance of a molded article manufactured by the present method, plural continuous fiber-reinforcing materials may be overlaid onto one another in the step (1).

With regard to the barrier layer of the present method, the same context as described in the section of "barrier layer" of "fiber-reinforced resin molded article" can be also employed.

Namely, the barrier layer is a sheet-like substrate having a structure with the plurality of fibers crossing one another, and, for the structure with the plurality of fibers crossing one another, the resin composition (C) is more preferably impregnated therein.

An article used for the barrier layer can be composed of at least one selected from a cloth prepreg, a non-crimp fabric, a cord fabric, and a non-woven fabric, but, similar to the description in the section of "barrier layer" of "fiber-reinforced resin molded article", a non-woven fabric is preferable.

When a fiber is used for an article to be used for the barrier layer, the fiber is preferably a reinforcement fiber like carbon fiber, glass fiber, and polyamide as it is described before.

Furthermore, in view of the tendency that there is less likelihood of having breakage or deformation of the barrier layer during molding, melting point Tf (° C.) of the fiber preferably satisfies the relationship of $Tp-10 \leq Tf$ when the molding temperature for manufacturing a fiber-reinforced resin molded article is Tp (° C.). The melting point satisfies more preferably the relationship of $Tp-30 \leq Tf$, and even more preferably the relationship of $Tp-50 \leq Tf$.

When a prepreg is used for an article to be used for the barrier layer, it is preferable that the resin composition (C) is impregnated in a fabric of reinforcement fibers. Furthermore, also in a case in which reinforcement fibers are used like non-crimp fabric, cord fabric, and non-woven fabric, it is preferable that the resin composition (C) is impregnated therein, but it is not limited thereto.

With regard to the resin composition (C), the same context as described in the section of "barrier layer" of "fiber-reinforced resin molded article" can be also employed.

When a prepreg is used for the barrier layer, those in a non-cured state or a semi-cured state are preferable.

From the viewpoint of the productivity of the present method, it is preferable that only one layer of the barrier layer is formed by the step (1). However, it is not limited thereto, and the barrier layer may be constituted with plural layers.

Furthermore, also in the present method, the resins to be included in the resin composition (A), the resin composition (B), and the resin composition (C) can be the same resin, and it is also possible that only one of those resins is a different resin or all of those resins are different from one another.

Hereinbelow, an example of embodiments of the present method is explained in detail by using drawings. However, the present method is not limited to those described hereinbelow.

(Step (1))

Figure 2:
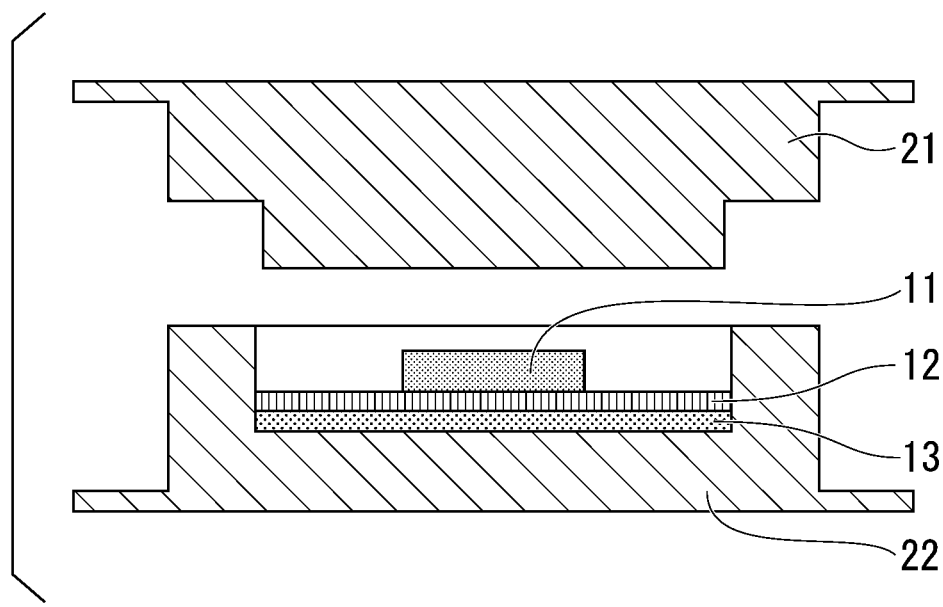
FIG. 2 is a cross-section side view illustrating an outline of the representative molding frame according to embodiments of the present invention.
Figure 3:
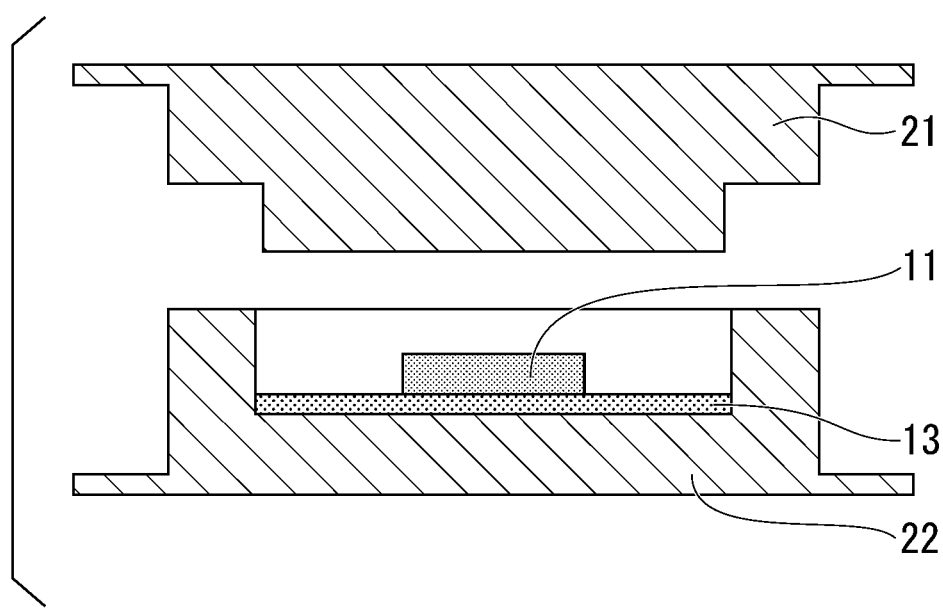
FIG. 3 is a cross-section side view illustrating, compared to the present invention, an outline of the representative molding frame according to comparative form.

The step (1) is a step of overlaying a sheet molding compound 11, an article 12 constituting the barrier layer, and a continuous fiber-reinforcing material 13 such that they are laminated in this order. FIG. 2 is a cross-section side view illustrating one example of the present method in which the case of overlaying, one layer for each to have lamination, the sheet molding compound 11, the article 12 constituting the barrier layer, and the continuous fiber-reinforcing material 13 is shown for the sake of convenience, but various reinforcement parts or shape forms can be present other that the illustrated, and they are not limited to FIG. 2.

Although it is not illustrated, it is also possible for example that, in the state of FIG. 2, the article 12 constituting the barrier layer is newly formed on a top side of the sheet molding compound 11, the continuous fiber-reinforcing material 13 is disposed while being interposed by the article 12, and overlaying is made so as to have their lamination.

In the step (1), it is preferable to have overlaying with interposing by the article 12 constituting the barrier layer such that the sheet molding compound 11 and the continuous fiber-reinforcing material 13 have no part in which they are in contact with each other without being interposed by the article 12 constituting the barrier layer. Namely, it is preferable that the sheet molding compound 11 and the continuous fiber-reinforcing material 13 preferably have no part in which they are directly in contact with each other.

However, it is not necessarily limited thereto, and, as long as it is within a range in which the effect of the present invention is not impaired, there may be a part in which the sheet molding compound 11 and the continuous fiber-reinforcing material 13 are in contact with each other without being interposed by the article 12 constituting the barrier layer, and, as an acceptable embodiment of the overlaying mode, this is also encompassed by the present invention.

(Step (2))

The step (2) is a step of carrying out molding by melting a resin of the sheet molding compound 11.

As the resin contained in the sheet molding compound 11 melts, the continuous fiber-reinforcing material 13 is melt-adhered while being interposed by the article 12 constituting the barrier layer.

As a method for carrying out molding by melting the resin contained in the sheet molding compound 11, a general method like autoclave molding, vacuum bag molding, and press molding can be selected. Among them, from the viewpoint of the productivity, press molding is preferable, and thermal compression molding using a mold is more preferable.

In case of thermal compression molding using a mold, heating condition is preferably 100 to 200 degrees. Condition for compression is preferably 1 to 10 MPa. Time for thermal compression is preferably 1 to 20 minutes.

(Working Effect)

According to the present invention, a method for manufacturing a fiber-reinforced resin molded article having continuous fiber-reinforcing material with favorable productivity can be provided while problems like location displacement of a continuous fiber-reinforcing material or disorderly orientation of continuous fiber constituting the continuous fiber-reinforcing material are resolved.

Namely, by disposing the article 12 constituting the barrier layer, the location displacement of the continuous fiber-reinforcing material 13 and disorderly orientation of the continuous fibers can be prevented and also the molding materials can be set in one trial using one mold, and thus the production cycle can be shortened, yielding enhanced productivity compared to a method of a related art.

During molding of the present molded article, even when the resin of the sheet molding compound 11 melts and the non-continuous reinforcement fibers show fluid movement with the melt resin on a surface of the article 12 constituting the barrier layer, due to the interposing by the fiber structure of the article 12 constituting the barrier layer, the continuous fibers in the continuous fiber-reinforcing material 13 do not follow the fluid movement of the non-continuous reinforcement fibers and melt resin. Because fibers of the article 12 constituting the barrier layer are restrained, between each fiber in the fibers, in a direction other than the fiber length direction, the fluid movement of the melt resin on a surface of the article 12 is not propagated to the continuous fiber-reinforcing material 13.

EXAMPLES

Hereinbelow, the present invention is specifically explained by the examples, but the present invention is not limited to them.

In the examples, as the continuous fiber-reinforcing material 13, carbon fiber prepreg (manufactured by Mitsubishi Chemical Corporation, trade name "TR360E250S"), which is a UD prepreg, was used. Furthermore, as the sheet molding compound 11, a carbon fiber sheet molding compound (manufactured by Mitsubishi Chemical Corporation, trade name "STR120N131") was used.

Example 1

4 Pieces of a UD prepreg cut to a size of 180 mm×180 mm were prepared, and, after aligning the carbon fiber direction in the same direction, they are laminated. Furthermore, 300 g of a carbon fiber sheet molding compound was prepared by cutting. As the article 12 constituting the barrier layer, 10 gsm product of GLASPER manufactured by Oji F-Tex Co., Ltd. (porosity of 25%, inter-fiber crossing number of 169 crossings/cm$^2$, and weight per unit area of 10 g/m$^2$), which is a glass non-woven fabric, was cut to a size of 170 mm×170 mm and used.

In the mold shown in FIG. 2, a laminate obtained by laminating, from bottom to top, the UD prepreg, glass non-woven fabric, and carbon fiber sheet molding compound in the order was mounted on a bottom mold 22. After that, by carrying out thermal compression molding at conditions including surface pressure of 4 MPa, mold temperature of 140° C., and curing temperature of 5 minutes, the resin of the carbon fiber sheet molding compound was melt to mold a fiber-reinforced resin molded article.

Example 2

A fiber-reinforced resin molded article was molded in the same manner as Example 1 except that process cloth H25X104HT manufactured by UNITIKA Ltd. (porosity of 25%, inter-fiber crossing number of 625 crossings/cm$^2$, and weight per unit area of 25 g/m$^2$), which is a glass scrim cloth, is used as the article 12 constituting the barrier layer.

Example 3

A fiber-reinforced resin molded article was molded in the same manner as Example 1 except that a 2-inch random material sheet is used as the article 12 constituting the barrier layer. The random material sheet used herein is obtained by cutting the UD prepreg used in Example 1 to have length of 2 inches and width of 1 cm and preparing it as a 180 mm×180 mm sheet according to random orientation of the continuous fibers in each prepreg (porosity of 29%, inter-fiber crossing number of 5 crossings/cm$^2$, weight per unit area of 292 g/m$^2$, and resin content ratio of 30% by weight).

Example 4

A fiber-reinforced resin molded article was molded in the same manner as Example 1 except that LNS0015 manufactured by KUREHA Ltd. (porosity of 16%, inter-fiber crossing number of 151 crossings/cm$^2$, and weight per unit area of 15 g/m$^2$), which is a polyamide non-woven fabric, is used as the article 12 constituting the barrier layer.

Example 5

A fiber-reinforced resin molded article was molded in the same manner as Example 1 except that G5025 manufactured by KUREHA Ltd. (porosity of 28%, inter-fiber crossing number of 294 crossings/cm$^2$, and weight per unit area of 25 g/m$^2$), which is a polyester non-woven fabric, is used as the article 12 constituting the barrier layer.

Example 6

A fiber-reinforced resin molded article was molded in the same manner as Example 1 except that TR3110360GMP manufactured by Mitsubishi Chemical Corporation (porosity of 0%, inter-fiber crossing number of 25 crossings/cm$^2$, weight per unit area of 250 g/m$^2$, and resin content ratio of 40% by weight), which is a cloth prepreg, is used as the article 12 constituting the barrier layer.

Comparative Example 1

A fiber-reinforced resin molded article was manufactured in the same manner as Example 1 except that the article 12 constituting the barrier layer is not laminated on a laminate.

Conditions of Examples and Comparative Examples, and the meandering angle θ for confirming one-directional continuous fibers on a surface layer after molding are summarized in Table 1.

TABLE 1

| | Comparative Example 1 | Example 1 | Example 2 | Example 3 | Example 4 | Example 5 | Example 6 |
|---|---|---|---|---|---|---|---|
| Barrier layer | Not present | Glass non-woven fabric | Glass scrim cloth | 2-Inch random material sheet | Polyamide non-woven fabric | Polyester non-woven fabric | Cloth prepreg |
| Porosity (%) | — | 25 | 25 | 29 | 16 | 28 | 0 |
| Inter-fiber crossing number (crossings/cm2) | — | 169 | 625 | 5 | 151 | 294 | 25 |
| Weight per unit area (g/m2) | — | 10 | 25 | 292 | 15 | 25 | 250 |
| Barrier layer resin composition | — | Not present | Not present | Present | Not present | Not present | Present |
| Meandering angle θ (°) | 20.0 | 10.1 | 11.3 | 9.9 | 10.6 | 9.9 | 7.6 |

As a result of determining the one-directional continuous fibers on a surface of the fiber-reinforced resin molded article which has been manufactured in Examples 1 to 6, it was found that disorderly orientation of the continuous fibers is suppressed in all of them compared to Comparative Example.

Furthermore, as a result of observing the cross-section of the fiber-reinforced resin molded article which has been manufactured in Examples 1 to 6, in any one of those examples, the resin derived from a sheet molding compound was not determined from a surface at which the barrier layer and the layer of the continuous fiber-reinforcing material are in contact with each other.

Meanwhile, as a result of observing the cross-section of the fiber-reinforced resin molded article which has been manufactured in Examples 1, 2, 4, and 5, the permeated resin derived from the continuous fiber-reinforcing material was found to be present on a surface layer part of the barrier layer that is in contact with the layer of the continuous fiber-reinforcing material and also near the surface layer part in thickness direction, and the permeated resin derived from the sheet molding compound was found to be present on a surface layer part of the barrier layer in contact with the layer of the sheet molding compound and also near the surface layer part in thickness direction.

On the other hand, as a result of determining the one-directional continuous fibers on a surface layer of the fiber-reinforced resin molded article which has been manufactured in Comparative Example 1, disorderly orientation of continuous fiber caused by fluid movement of melt sheet molding compound was confirmed.

As described in the above, the fiber-reinforced resin molded article obtained by interposing a barrier layer between a sheet molding compound and a continuous fiber-reinforcing material followed by molding based on their lamination shows that the problem of disorderly orientation of continuous fiber in the continuous fiber-reinforcing material, which is disposed on a surface of the molded article, is resolved.

Accordingly, it is considered that, as the present molded article has no decrease in strength that is caused by disorderly orientation, the effect of reinforcing the strength by a continuous fiber-reinforcing material is sufficiently exhibited.

Furthermore, the problem of location displacement of a continuous fiber-reinforcing material, which is caused by disorderly orientation of continuous fiber, is also resolved and the problem of a decrease in aesthetic property is resolved, too.

INDUSTRIAL APPLICABILITY

The fiber-reinforced resin molded article of the present invention has suppressed disorderly orientation of continuous fiber of a continuous fiber-reinforcing material that is arranged and disposed on a surface thereof, and has excellent strength and aesthetic property. Furthermore, according to the method for manufacturing a fiber-reinforced resin molded article of the present invention, a fiber-reinforced resin molded article having excellent strength and aesthetic property can be manufactured efficiently.

EXPLANATIONS OF LETTERS OR NUMERALS

1 LAYER OF SHEET MOLDING COMPOUND
2 LAYER OF CONTINUOUS FIBER-REINFORCING MATERIAL
3 BARRIER LAYER
10 FIBER-REINFORCED RESIN MOLDED ARTICLE
11 SHEET MOLDING COMPOUND
12 ARTICLE CONSTITUTING BARRIER LAYER
13 CONTINUOUS FIBER-REINFORCING MATERIAL
21 TOP MOLD
22 BOTTOM MOLD

The invention claimed is:

1. A fiber-reinforced resin molded article, comprising:
a first layer;
a second layer; and
a third layer,
wherein the second layer is interposed between the first layer and the third layer,
wherein the first layer is a layer made from a sheet molding compound,
wherein the third layer is a layer made from a prepreg and comprising a continuous reinforcement fiber derived from the prepreg,
wherein the second layer is a barrier layer,
wherein a resin derived from the prepreg is present in a surface layer part of the second layer in contact with the third layer and also near the surface layer part in thickness direction in the second layer, and
wherein the second layer comprises an article having a porosity in a range of from 3 to 30%.

2. A fiber-reinforced resin molded article, comprising:
a first layer;
a second layer; and
a third layer,
wherein the second layer is interposed between the first layer and the third layer, wherein the first layer is a layer made from a sheet molding compound, wherein the third layer is a layer made from a prepreg and comprising a continuous reinforcement fiber derived from the prepreg, wherein the second layer is a barrier layer, wherein a resin derived from the prepreg is present in a surface layer part of the second layer in contact with the third layer and also near the surface layer part in thickness direction in the second layer, and wherein the meandering angle θ of the continuous reinforcement fiber on a surface of the third layer is 15 degrees of less.

3. The article of claim 2, wherein the second layer comprises a sheet substrate comprising a plurality of fibers crossing one another.

4. The article of claim 3, in which an inter-fiber crossing number in the sheet substrate is 5 crossings/cm² or more.

5. A method for manufacturing the fiber-reinforced resin molded article of claim 2, the method comprising:

preparing a laminate in which the sheet molding compound, a sheet substrate comprising a plurality of fibers crossing one another, and the prepreg are laminated in this order; and molding the laminate such that the second layer is formed to comprise the sheet substrate.

6. A fiber-reinforced resin molded article, comprising:
a first layer;
a second layer; and
a third layer, wherein the second layer is interposed between the first layer and the third layer, wherein the first layer is a layer made from a sheet molding compound, wherein the third layer is a layer made from a prepreg and comprising a continuous reinforcement fiber derived from the prepreg, wherein the second layer is a barrier layer, wherein a resin derived from the prepreg is present in a surface layer part of the second layer in contact with the third layer and also near the surface layer part in thickness direction in the second layer, and wherein a resin derived from the sheet molding compound is not present on a surface at which the second layer and the third layer are in contact with each other.

7. The article of claim 6, wherein the second layer comprises an article having a porosity in a range of from 3 to 30%.

8. The article of claim 3, wherein the second layer comprises a woven fabric, and/or a non-woven fabric as the sheet substrate.

9. The article of claim 8, wherein the second layer comprises a non-woven fabric as the sheet substrate.

10. The article of claim 6, wherein the prepreg comprises continuous reinforcement fibers aligned in one direction.

11. The article of claim 6, comprising an integration molded article of a laminate in which the sheet molding compound, a sheet substrate comprising a plurality of fibers crossing one another, and the prepreg are laminated in this order.

12. A method for manufacturing the fiber-reinforced resin molded article of claim 6, the method comprising:

preparing a laminate in which the sheet molding compound, a sheet substrate comprising a plurality of fibers crossing one another, and the prepreg are laminated in this order; and molding the laminate such that the second layer is formed to comprise the sheet substrate, wherein the laminate is prepared to comprise a woven fabric and/or a non-woven fabric as the sheet substrate.

13. The method of claim 12, wherein the laminate is prepared to comprise a non-woven fabric as the sheet substrate.

14. The method of claim 12, wherein the prepreg comprises continuous reinforcement fibers aligned in one direction.

15. The method of claim 12, wherein the molding is performed by thermal compression molding using a mold.

16. A fiber-reinforced resin molded article, comprising:
a first layer;
a second layer; and
a third layer, wherein the second layer is interposed between the first layer and the third layer, wherein the first layer is a layer made from a sheet molding compound, wherein the third layer is a layer made from a prepreg and comprising a continuous reinforcement fiber derived from the prepreg, wherein the second layer is a barrier layer, wherein a resin derived from the prepreg is present in a surface layer part of the second layer in contact with the third layer and also near the surface layer part in thickness direction in the second layer, and wherein the sheet molding compound includes a thermoplastic resin.

17. A method for manufacturing a fiber-reinforced resin molded article, the method comprising:

preparing a laminate in which a sheet molding compound, a sheet substrate comprising a plurality of fibers crossing one another, and a prepreg are laminated in this order; and molding the laminate such that a second layer is formed to comprise the sheet substrate, wherein the sheet molding compound comprises a thermoplastic resin, and wherein the fiber-reinforced resin molded article, comprises:
a first layer;
the second layer; and
a third layer, wherein the second layer is interposed between the first layer and the third layer, wherein the first layer is a layer made from the sheet molding compound, wherein the third layer is a layer made from the prepreg and comprising a continuous reinforcement fiber derived from the prepreg, wherein the second layer is a barrier layer, wherein a resin derived from the prepreg is present in a surface layer part of the second layer in contact with the third layer and also near the surface layer part in thickness direction in the second layer, and wherein the meandering angle θ of the continuous reinforcement fiber on a surface of the third layer is 15 degrees of less.

18. A method of manufacturing a fiber-reinforced resin molded article, the method comprising:

preparing a laminate in which a sheet molding compound, an article having a porosity in a range of from 3 to 30%, and a prepreg are laminated in this order; and molding the laminate such that a second layer is formed to comprise the article having the porosity, wherein the fiber-reinforced resin molded article, comprises:
a first layer;
a second layer; and
a third layer,
wherein the second layer is interposed between the first layer and the third layer,
wherein the first layer is a layer made from the sheet molding compound,
wherein the third layer is a layer made from the prepreg and comprising a continuous reinforcement fiber derived from the prepreg,
wherein the second layer is a barrier layer, and
wherein a resin derived from the prepreg is present in a surface layer part of the second layer in contact with the third layer and also near the surface layer part in thickness direction in the second layer.

19. The method of claim 18, wherein the laminate is prepared to comprise a sheet substrate comprising a plurality of fibers crossing one another as the article having the porosity.

20. The method of claim 19, wherein the laminate is prepared to comprise at least one selected from a woven fabric and a non-woven fabric as the sheet substrate.

* * * * *